(12) United States Patent
Zhou et al.

(10) Patent No.: US 12,308,645 B2
(45) Date of Patent: May 20, 2025

(54) ALTERNATING-CURRENT POWER HARMONIC-BASED CIRCUIT STATE DETECTION

(71) Applicant: Google LLC, Mountain View, CA (US)

(72) Inventors: Xiaohu Zhou, Sunnyvale, CA (US); Dayu Qu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/556,036

(22) PCT Filed: Sep. 13, 2022

(86) PCT No.: PCT/US2022/076371
§ 371 (c)(1),
(2) Date: Oct. 18, 2023

(87) PCT Pub. No.: WO2024/058805
PCT Pub. Date: Mar. 21, 2024

(65) Prior Publication Data
US 2025/0079841 A1 Mar. 6, 2025

(51) Int. Cl.
*H02J 3/01* (2006.01)
*H02J 1/00* (2006.01)
(Continued)

(52) U.S. Cl.
CPC ............... *H02J 3/01* (2013.01); *H02J 1/002* (2020.01); *H02J 3/0012* (2020.01); *H02J 3/14* (2013.01); *H02J 2310/12* (2020.01); *H04N 7/186* (2013.01)

(58) Field of Classification Search
CPC .. H02J 3/01; H02J 1/002; H02J 3/0012; H02J 3/14; H02J 2310/12; H04N 7/186
See application file for complete search history.

(56) References Cited

U.S. PATENT DOCUMENTS 9,448,567 B2   9/2016   Warren et al.
9,952,608 B2   4/2018   Warren et al.
(Continued)

FOREIGN PATENT DOCUMENTS

JP   6538418   7/2019

OTHER PUBLICATIONS

"EMO T Thermal actuator for heating, ventilation and air conditioning systems", Retrieved at: file:///C:/Users/Sean.CN/Downloads/old_EMO-T_EN_up_to_2011-04.pdf—on Jun. 4, 2024, 8 pages.
(Continued)

*Primary Examiner* — Rexford N Barnie
*Assistant Examiner* — Thai H Tran
(74) *Attorney, Agent, or Firm* — Colby Nipper PLLC

(57) ABSTRACT

This document describes systems for and techniques of alternating-current (AC) power harmonic-based circuit state detection. In various aspects, a system includes a component, a bypass circuit for the component, and a controller with an AC power harmonic-based circuit state detector that can determine a state of the bypass circuit. The AC power harmonic-based circuit state detector may convert an AC voltage of the AC power to a direct current (DC) voltage, filter the DC voltage to obtain a voltage of a harmonic of the AC power, and compare the voltage of the harmonic to a threshold to determine that the bypass circuit is in a fault state (blown fuse). By so doing, the controller of the system can notify a user that the bypass circuit needs to be reset or replaced to reenable operation of the system and avoid poor user experience typically associated with a non- or misfunctioning system.

20 Claims, 9 Drawing Sheets

(51) Int. Cl.
  *H02J 3/00* (2006.01)
  *H02J 3/14* (2006.01)
  *H04N 7/18* (2006.01)

(56) References Cited

U.S. PATENT DOCUMENTS

| | | | |
|---|---|---|---|
| 10,283,996 | B2 | 5/2019 | Fetterman et al. |
| 10,607,458 | B1 | 3/2020 | Sampson et al. |
| 10,819,148 | B2 | 10/2020 | Warren et al. |
| 2011/0163153 | A1 | 7/2011 | Coetzee |
| 2013/0206617 | A1 | 8/2013 | Lutzig et al. |
| 2015/0002165 | A1 | 1/2015 | Juntunen et al. |
| 2016/0193929 | A1 | 7/2016 | Sakakibara |
| 2018/0195333 | A1* | 7/2018 | Jeon .................. G08B 3/10 |
| 2019/0063807 | A1 | 2/2019 | Dumas et al. |
| 2020/0005604 | A1 | 1/2020 | Long et al. |
| 2021/0175792 | A1* | 6/2021 | Kasmir ............. H02M 1/143 |
| 2022/0237993 | A1* | 7/2022 | Warren ............. H03K 17/122 |

OTHER PUBLICATIONS

"Power Stage Reference Design for Power Stealing Thermostat", TI Designs: TIDA-01574, Jan. 2018, 17 pages.

"What is Phantom Power or Power Stealing?", Retrieved at: https://www.honeywellhome.com/us/en/support/what-is-phantom-power-or-power-stealing/—on Jun. 4, 2024, 4 pages.

Chan, Andrew, "Active Power Sharing of Thermostat Device with Wax-Actuated ZZone Valves one Valve", Technical Disclosure Commons, https://www.tdcommons.org/dpubs_series/7183, Jul. 14, 2024, 11 pages.

"International Search Report and Written Opinion", Application No. PCT/US2022/076371, Apr. 26, 2023, 12 pages.

"International Preliminary Report on Patentability", Application No. PCT/US2022/076371, Mar. 1, 2025, 9 pages.

* cited by examiner

Bypass Circuit Operation Normal

Bypass Circuit in Fault State (Fuse Open)

ALTERNATING-CURRENT POWER HARMONIC-BASED CIRCUIT STATE DETECTION

RELATED APPLICATION(S)

This application is a national stage entry of International Application No. PCT/US2022/076371, filed Sep. 13, 2022, the disclosure of which is incorporated herein by reference in its entirety.

BACKGROUND

Any one of a variety of electronic devices require power, either by an alternating-current (AC) source or a direct-current (DC) source. Some of these devices may be configured to be powered directly by AC mains power at an outlet in a wall of a home, business, or other dwelling. Other devices may be configured to be powered by AC power from a step-down transformer, for example. Yet other devices may be configured to be powered by DC power via an on-board or an off-board AC-to-DC power converter (e.g., a power brick) or a battery. In other words, electronic devices are powered.

In some implementations, AC mains power, or a derivative thereof (e.g., power from a step-down transformer), provides power to multiple circuits of an electronic device and/or system simultaneously. These multiple circuits or sub-circuits may be implemented separate from one another, such that communication is limited between the circuits. Further, some remote circuits may be configured to implement various system operations without inter-circuit communication capabilities. As such, when one of the multiple circuits fails to operate as expected, the other circuits or a controller of the electronic system may not be aware of the circuit failure (e.g., partial failure, complete failure), a condition of the failing circuit, or the failing circuit may cause power issues (e.g., brownouts) in the other circuits or the controller. An electronic system that partially functions, or functions on an intermittent basis, often leads to user frustration and results in a poor user experience.

SUMMARY

This document describes systems and techniques for alternating-current (AC) power harmonic-based circuit state detection. In various aspects, a system includes a component, a bypass circuit for the component, and a controller with an AC power harmonic-based circuit state detector that can determine a state of the bypass circuit. In some cases, the system is configured as a video-recording doorbell system in which the component includes a solenoid of a doorbell chime, and the bypass circuit includes a bypass device that bypasses the solenoid to allow AC power to flow directly to a controller of the video-recording doorbell system. In aspects, the AC power harmonic-based circuit state detector may convert an AC voltage of the AC power to a direct current (DC) voltage and filter the DC voltage to obtain a voltage of a harmonic of the AC power. The detector can then compare the voltage of the harmonic to a threshold to determine that the bypass circuit is in a fault state (e.g., fuse blown). By so doing, the controller of the system can notify a user that the bypass circuit needs to be reset or replaced to restore operation of the system and avoid poor user experience typically associated with a non- or mis-functioning system.

In some aspects, a system includes a first current input/output (I/O) node configured to receive AC power, a second current I/O node configured to receive the AC power, and a passive component having a first terminal coupled to the first current I/O node. The system also includes a bypass circuit that includes a first terminal coupled to the first terminal of the passive component, a second terminal coupled to a second terminal of the passive component, and a switch coupled between the first terminal and second terminal of the bypass circuit. A controller of the system has a first terminal coupled to the second terminal of the passive component and the second terminal of the bypass circuit, a second terminal coupled to the second current I/O node, and an AC power harmonic-based circuit state detector. The AC power harmonic-based detector can be configured to convert an AC voltage of the AC power received at the first terminal and second terminal of the controller to a DC voltage, filter the DC voltage to obtain a voltage of a harmonic of the AC power received at the first terminal and the second terminal of the controller, compare the voltage of the harmonic of the AC power to a voltage threshold, and determine a state of the bypass circuit based on the comparison of the voltage of the harmonic of the AC power to the voltage threshold.

In other aspects, a method includes receiving AC power from a circuit that includes a bypass circuit for a component of the circuit. The method then converts an AC voltage of the AC power to a DC voltage and filters the DC voltage to obtain a voltage of a harmonic of the AC power received from the circuit. The voltage of the harmonic is then compared to a voltage threshold and a state of the bypass circuit is determined based on the voltage of the harmonic exceeding the voltage threshold. Additionally, the method may include alerting a service provider or user of a system that includes the circuit to a fault condition of the bypass circuit when detected as the state of the bypass circuit.

In yet other aspects, a video-doorbell system includes a doorbell chime with a first terminal coupled to a first terminal of a transformer configured to provide alternating current (AC) power and a bypass device having a first terminal coupled to the first leg of the first terminal of the transformer. The system further includes a video-recording doorbell with a first terminal coupled to a second terminal of the doorbell chime or a second terminal of the bypass device, a second terminal coupled to a second terminal of the transformer, and an AC power harmonic-based circuit state detector. The AC power harmonic-based circuit state detector can be configured to convert an AC voltage of the AC power to a direct current DC voltage, filter the DC voltage to obtain a voltage of a harmonic of the AC power received through the doorbell chime, or bypass device, compare the voltage of the harmonic of the AC power to a voltage threshold, and detect a fault condition of the bypass device in response to the voltage of the harmonic of the AC power exceeding the voltage threshold.

The details of one or more implementations are set forth in the accompanying Drawings and the following Detailed Description. Other features and advantages will be apparent from the Detailed Description, the Drawings, and the Claims. This Summary is provided to introduce subject matter that is further described in the Detailed Description.

BRIEF DESCRIPTION OF THE DRAWINGS

The details of one or more aspects of AC power harmonic-based circuit state detection are described in this document with reference to the following Drawings, in which the use of same numbers in different instances may indicate similar features or components.

DETAILED DESCRIPTION

Overview

Figure 1:
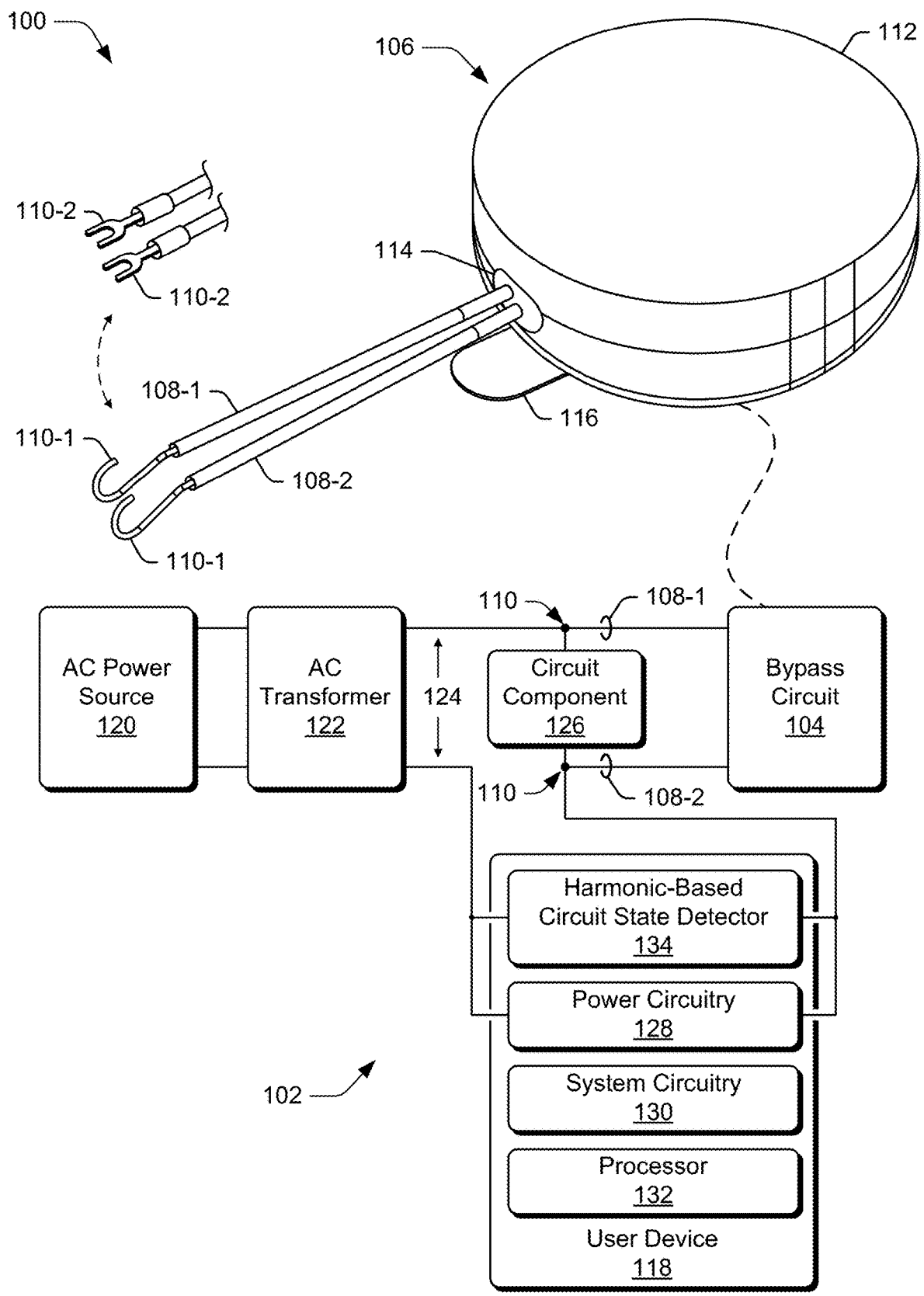
FIG. 1 illustrates an example electronic system in which aspects of AC power harmonic-based circuit state detection may be implemented.

In implementations where mains power, or a derivative thereof (e.g., power from a step-down transformer), provides power to separate circuits or components of an electronic system simultaneously, the circuits or components may have limited or no communication between the circuits. Further, some remote circuits or components may be configured to implement various circuit operations without inter-circuit communication capabilities. As such, when one of the multiple circuits fails to operate as expected, the other circuits or controllers of the electronic system may not be aware of the circuit failure (e.g., partial failure, complete failure), a condition of the failing circuit, or the failing circuit may cause power issues (e.g., brownouts) for the other circuits or the controller of the system. An electronic system that partially functions, or functions on an intermittent basis, often leads to user frustration and results in a poor user experience.

This document describes systems and techniques for AC power harmonic-based circuit state detection that may enable a controller of a system to detect a fault in a circuit of the system and notify a user of the fault, thereby avoiding poor user experience associated with a nonfunctional system. Generally, the described aspects may enable a controller of a system or circuit to determine a state of a component or circuit of the system based on a harmonic of AC power that passes through or diverts around the component or the circuit. Although reference herein is made to a video-recording doorbell system, the described aspect may be applied to any system or circuit that shares or has access to AC power provided to components of the system or circuit.

In aspects of AC power harmonic-based circuit state detection, an electronic system may be configured as a video-recording doorbell system that is configured to couple to an AC-based system of a doorbell chime, which may be found in many homes. Although described in reference to a video-recording doorbell, the aspects described herein may apply to any AC-based electronic system, which may include a thermostat, a garage door opener, an intercom system, a lighting controller, a smart electric panel (and breakers thereof), a smoke detector, an Internet-of-Things (IoT) device, a smart appliance, and so forth. Generally, a system configuration of the doorbell system may include a puck or doorbell bypass device that is coupled in parallel with a chime component of the doorbell and a user device, which includes a camera, microphone, and wireless transceivers, that couples in series with the chime and bypass device (or bypass circuit). Typically, the user device may couple into the AC wiring where a traditional doorbell button (e.g., normally open switch) is placed near an entry door of a residence. In normal operation, an AC current flows through the doorbell bypass device to the video doorbell user device. In most cases, the doorbell bypass device includes a normally closed (N.C.) switch to selectively bypass a solenoid of the chime when closed or to short the AC current through the solenoid of the chime when closed to cause the chime to ring. Further, the video doorbell user device can include a normally open switch (N.O.) switch to selectively lead the AC current into power circuitry of the user device to power the user device when open or to short the AC current through the solenoid of the chime when closed.

In some cases, a fault occurs within circuitry of the bypass device, which prevents the bypass circuitry from causing the AC current to bypass the chime component. Thus, the AC current flows through the solenoid or coil of the chime component, which has a higher impedance than the switch circuitry of the bypass device (e.g., on-resistance of the switch plus resistance of a current-limiting resistor). This increase of impedance in the power circuit of the video doorbell user device may introduce a voltage drop or distortion of the AC voltage of the AC power received at the user device, which pollutes the AC power quality. Although the video doorbell user device may still partially operate on the low or polluted AC power supply, without a functional bypass device, function of the video doorbell system may be impaired. For example, the video doorbell device may brownout due to low voltage or lack of power, the chime component may no longer ring, or the redirected current may cause buzzing or other indeterminate system behavior that results in a poor user experience. As described herein, aspects of AC power harmonic-based circuit state detection may use characteristics of the polluted AC power supply to detect failure of the bypass device or other AC-based system circuitry, which may enable the issuance of system or user alerts to address a fault condition of the bypass device (or another circuit) to restore operation of the video doorbell system.

Generally, when AC power quality is polluted due to increased circuit impedance (e.g., AC current through chime solenoid), the pollution specifications include total harmonic distortion (THD), as well as individual order of harmonics. As described herein, aspects of AC power harmonic-based circuit state detection may use THD or an individual order of harmonics to detect a state of a circuit. In such cases, the described aspects may implement low-cost and/or low-power analog circuitry to obtain and use an individual order of harmonics to detect a state of the circuit instead of attempting to compute the total harmonic distortion of the AC power supply using the computational power of the user device's processor, which consumes more power and adds to the computation load of the video doorbell user device. Thus, aspects of AC power harmonic-based circuit state detection can be implemented at least partially in analog circuitry to detect a fault in a bypass device with reduced cost, lower power consumption, and without increasing the computational load of the user device processor.

In aspects, a harmonic-based circuit state detector may measure or use the polluted power quality (e.g., THD or harmonic of voltage) as criteria to detect a particular state or a fault of a circuit (e.g., bypass device). As noted, when the bypass device of the video doorbell system enters a fault state, the AC current can flow through the chime component to the user device of the video doorbell. In accordance with one or more aspects, the user device may include a sensing bridge coupled between power-input terminals of the user device to sense or rectify the distorted AC voltage of the AC power. For example, the sensing bridge may convert the AC voltage into DC voltage through diode-based rectification. The DC voltage is then sent to a filter circuit to extract a harmonic (e.g., a 6th-order harmonic) of the AC power entering the user device. A comparator of the user device compares a voltage magnitude of the extracted harmonic to a reference voltage and provides an output based on that comparison to the processor of the user device. In response to detecting a fault based on the comparison, the processor can initiate a system alert or user alert to notify the user of the fault in the bypass device. Alternatively or additionally, a device may use an amount or level of THD present in AC power received by the device to determine a state of an AC power source or a state of a circuit associated with the AC power source.

In other aspects described herein, a system includes a component, a bypass circuit for the component, and a controller with an AC power harmonic-based circuit state detector that can determine a state of the bypass circuit. In some cases, the system is configured as a video-recording doorbell system in which the component includes a solenoid of a doorbell chime, the bypass circuit includes a bypass device that bypasses the solenoid to allow AC power to flow directly to a controller of the video-recording doorbell system. In aspects, the AC power harmonic-based circuit state detector may convert an AC voltage of the AC power to a direct current (DC) voltage and filter the DC voltage to obtain a voltage of a harmonic of the AC power. The detector can then compare the voltage of the harmonic to determine that the bypass circuit is in a fault state (e.g., fuse blown). Alternatively or additionally, the AC power harmonic-based circuit state detector may determine an amount of THD present in the AC voltage and compare the amount of THD to a threshold to determine a state of the bypass circuit. By so doing, the controller of the system can notify a user that the bypass circuit needs to be reset or replaced to reenable operation of the system and avoid poor user experience typically associated with a non- or mis-functioning system.

Aspects of AC power harmonic-based circuit state detection may be implemented with or using low-power analog circuitry. Thus, in some aspects, a harmonic-based circuit state detector may include a diode-based sensing bridge, an analog filter circuit, and/or hardware-based comparator for signal processing, all of which consume low levels of power. Additionally, small package versions of these components can be selected to save board space on the printed circuit board (PCB) of a user device of a video-recording doorbell system. Further, the use of analog circuitry for circuit fault or state detection in accordance with various aspects does not increase computational load on the processor of the user device. Thus, the described aspects can be implemented at least partially in analog circuitry to enable detection of a fault in the bypass device with low cost, low power consumption, and without increasing computational load of the user device processor. Additionally, the use of analog components may enable aspects of AC power harmonic-based circuit state detection in devices with processors (e.g., low-power processor or microcontrollers) that are unable to filter and/or compare voltage levels. In other implementations, aspects of AC power harmonic-based circuit state detection may be implemented at least partially by a processor or system-on-chip (SoC) of the video-recording doorbell system. For example, an SoC of a video-recording doorbell may determine a level of THD present in AC supply voltage based on rectified and/or filtered voltage received at an input of the SoC. The SoC may then compare the level of THD to a threshold to determine a state of the bypass device or AC power supply from which the AC power is received.

The following discussion describes operating environments, systems, and techniques that may be employed in or by the operating environments, example systems, example methods, and example devices. Although systems and techniques for implementing AC power harmonic-based circuit state detection are described, it is to be understood that the subject of the appended claims is not necessarily limited to the specific features or methods described. Rather, the specific features and methods are described as example implementations, and reference is made to the operating environment by way of example only.

Operating Environment

FIG. 1 illustrates an example operating environment 100 in which various aspects of AC power harmonic-based circuit state detection can be implemented. Generally, the example environment 100 includes an electronic system 102, which may include a video-recording doorbell or any other type of electronic system that receives power from AC mains or a similar power source. For example, the electronic system 102 may include a thermostat, a garage door opener, an intercom system, a lighting controller, a smart electric panel (and breakers), a smoke detector, an Internet-of-Things (IoT) device, a smart appliance, or the like. In aspects, the electronic system 102 includes a bypass circuit 104 or bypass device 106 that enables AC current to bypass a component or portion of the circuitry of the electronic system. In alternate configurations, such as a thermostat or smart electric panel, the electronic system may not include a bypass device and be configured to monitor AC power received by the system at one or more points. For example, a smart electric panel may include at least three terminals to monitor AC power quality between a first leg/phase, a second leg/phase, a neutral, and/or a ground reference. In yet other implementations, the electronic system may include a power grid-monitoring device, a solar inverter, a home battery storage system, a gas generator, or any other type of AC regenerative source. Thus, aspects of AC power harmonic-based circuit state detection may apply to phase-to-neutral measurements, phase-to-phase measurements, or phase-to-ground measurements when extracting a harmonic of AC power for comparison by a controller of the electronic system. Further, although described with reference to harmonics, the aspects described herein may also determine a level or amount of THD in received power to implement techniques of circuit state detection or determination of AC power characteristics.

FIG. 1 shows a right-front perspective view of an example implementation of a bypass circuit 104 that is enclosed to form a bypass device 106 that includes hooked terminals. In some cases, the bypass device 106 is implemented as a "puck" that is electrically coupled to a doorbell electromechanical assembly that includes wiring to a step-down transformer and one or more doorbell switches, as well as chimes and solenoid to produce one or more tones when activated via switched AC current. In aspects, the bypass device 106 includes a first current input/output (I/O) node 108-1 (e.g., conductor, wire) and a second current I/O node 108-2 (e.g., conductor, wire). The first current I/O node 108-1 and the second current I/O node 108-2 may include electrically conductive wires or cables (e.g., a group or bundle of wires inside a common sheathing). The wires can be solid wires or stranded wires of any one of a variety of gauges (e.g., diameters) and electrically conductive materials (e.g., copper, aluminum). The cables can include two or more insulated phase line wires, an insulated or bare ground wire, a bare neutral wire, or any combination thereof. The sheathing is an electrically insulating material and can include any one of a variety of insulating materials, including thermoplastic, heat-resistant plastic, flame-retardant synthetic polymer, oil- and gasoline-resistant nylon, or the like.

FIG. 1 also illustrates that the first current I/O node 108-1 and the second current I/O node 108-2 include hook-shaped terminals 110-1 on one end and enter a housing 112 on an opposite end through an opening 114. Alternatively, as shown, the first current I/O node 108-1 and the second current I/O node 108-2 can be implemented with Y-shaped terminals 110-2 on one end and enter the housing on an opposite end through the opening 114. Although two types of terminals (e.g., hook-shaped terminals 110-1, Y-shaped terminals 110-2) are described herein, the current I/O nodes 108 can be implemented with terminals of any suitable shape or size appropriate to make an electrically conductive connection to an AC power source. The housing 112 may be implemented with a split housing design that includes a top cover, a bottom cover, and a mounting adhesive 116 disposed as a bottom layer beneath the bottom cover. The mounting adhesive 116 can be any one of a variety of adhesives, including wet adhesive, contact adhesive, reactive adhesive, pressure-sensitive adhesive (PSA), very high bond (VHB) tape, or the like. How the bypass circuit 104 and/or bypass device 106 may be implemented and used varies and is described throughout this disclosure.

As shown in FIG. 1, the electronic system 102 also includes a user device 118, which is coupled to an AC power source 120 through the bypass circuit 104. In aspects, an AC step-down transformer 122 (AC transformer 122) may step down AC mains voltage of the AC power source 120 from a range of 100 Volts (V) to 240 V AC down to a range of 16 V to 24 V AC at 124. The electronic system also includes a circuit component 126 coupled in series between the AC power source and the user device 118. The circuit component 126 may include a passive component, including an inductor, coil, solenoid, or the like. For example, the circuit component 126 can include a solenoid that actuates a mechanical assembly of a doorbell chime to produce a multitone ring when activated by the user device 118 or doorbell switch. In aspects, the first current I/O node 108-1 and the second current I/O node 108-2 of the bypass circuit 104 (or bypass device 106) are electrically coupled or connected in parallel with a first terminal and a second terminal of the circuit component 126 via terminals 110, respectively. Thus, the bypass circuit 104 may enable AC current to bypass the circuit component 126 to provide power to the user device 118 of the electronic system 102. Generally, the circuit component 126 has a different or higher electrical impedance than an internal impedance of the bypass circuit 104, such that AC power passing through the circuit component 126 has different harmonics or higher total harmonic distortion than AC power passing through the bypass circuit 104 (or bypass device 106).

In aspects, the user device 118 includes power circuitry 128, system circuitry 130, a processor 132, and a harmonic-based circuit state detector 134. The power circuitry 128 can be configured to receive AC power from the AC transformer 122 and convert the AC power to direct current (DC) power for components of the user device 118. The system circuitry 130 may be configured to enable functionalities of the user device 118, which may include video recording, image capture, audio recording, two-way audio communication, audio or light-based notifications, hardware or touch-sensitive buttons, motion sensors, wireless data communication, and so forth. Thus, although not shown, the system circuitry 130 of a user device 118 configured as a video-recording doorbell may include a camera system, audio system, communication transceivers, light-emitting diodes, I/O for hardware buttons, or the like. The processor 132 may include any number or type of processor cores and other data processing capabilities to enable operation of the user device 118. In some aspects, the processor 132 executes processor-executable instructions of an operating system or firmware of the user device 118 to implement various operations or functions of the user device 118.

As described herein, the harmonic-based circuit state detector 134 can detect or determine a state of the bypass circuit 104 or components thereof. As shown in FIG. 1, the harmonic-based circuit state detector 134 may be electrically coupled to power input terminals or the power circuitry 128 of the user device 118 to receive or sense the AC power received by the user device 118. In aspects, the harmonic-based circuit state detector 134 rectifies AC power received at the user device 118 to provide DC power and filters the DC power to obtain a harmonic of the received AC power. The harmonic-based circuit state detector 134 can then compare a voltage of the harmonic to a threshold to determine whether the bypass circuit is operating normally to pass clean AC power, such as when the voltage of the harmonic is below the threshold. Alternatively, the harmonic-based circuit state detector 134 may determine, in response to the voltage of the harmonic exceeding the threshold, that the bypass circuit 104 is in a fault state, thereby directing AC power through the circuit component 126 causing polluted AC power to reach the user device 118. Additional examples and implementations of the harmonic-based circuit state detector 134 are described throughout this disclosure.

Figure 2:
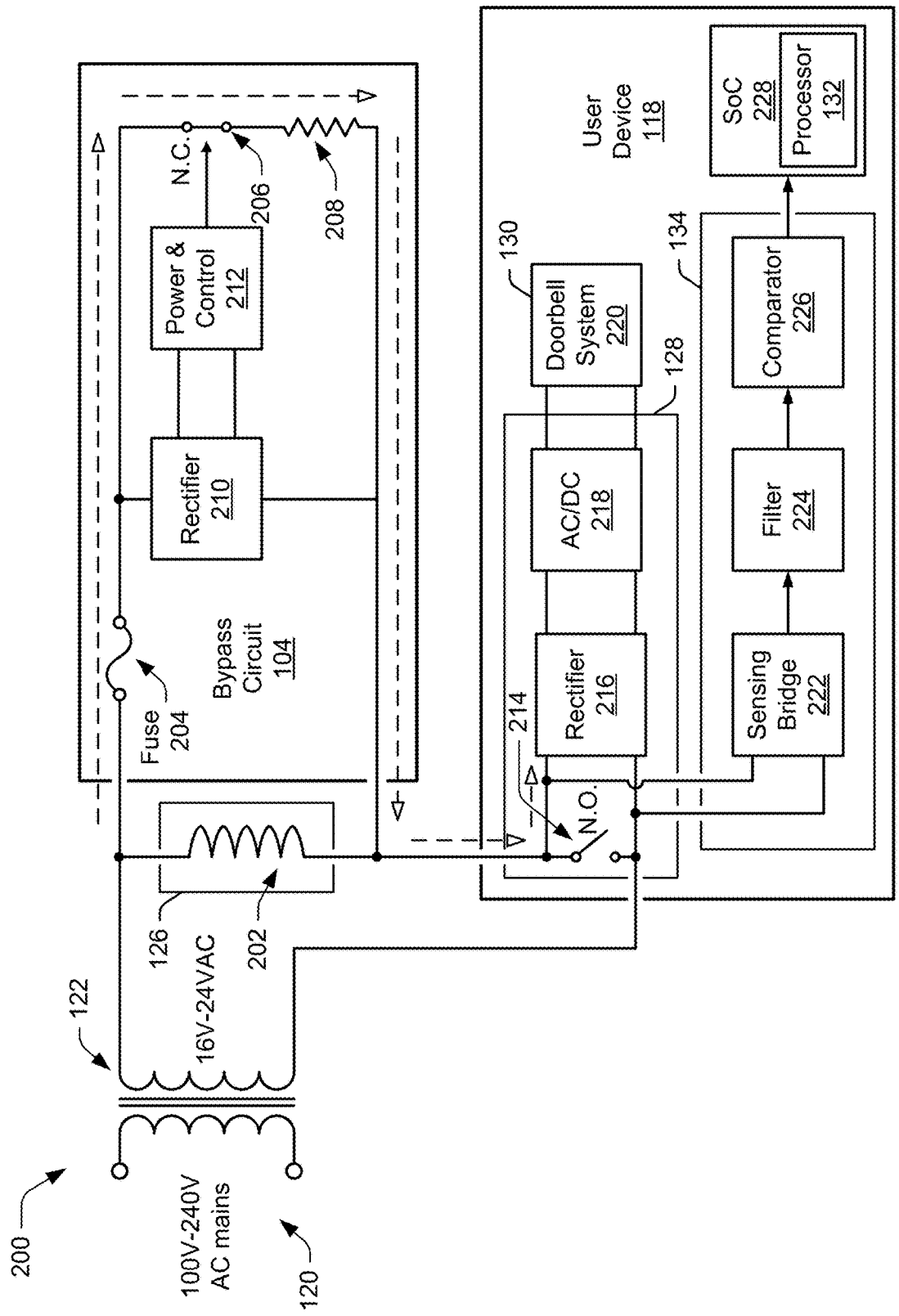
FIG. 2 illustrates an example component configuration of the electronic system of FIG. 1 in detail and with an example of AC current flow for powering a user device.

FIG. 2 illustrates at 200 an example component configuration of the electronic system 102 of FIG. 1 in detail and with an example of AC current flow for powering a user device. Generally, the component configuration 200 describes components and circuits of an electronic system that can implement various aspects of AC power harmonic-based circuit state detection. The electronic system may include a bypass device 106 and a user device 118 configured to implement a video-recording doorbell system with wireless communication capabilities. For the sake of visual brevity, various video and/or audio components may be omitted from FIGS. 2-5. In some aspects, the harmonic-based circuit state detector 134 associated with a user device 118 can determine that the bypass circuit 104 or bypass device 106 coupled to a doorbell chime (e.g., circuit component 126) is in a fault state or non-operational state. Additionally, the harmonic-based circuit state detector 134 may indicate the fault state to the processor 132 or an operating system of the user device 118, which may then alert a user or a service provider associated with the user device 118 such that the fault state may be addressed.

As shown in FIG. 2, various components of the electrical system are coupled to a 100 V to 240V source of AC mains power 120 through a step-down AC transformer 122 that provides AC power at approximately 16 V to 24 V AC. The described voltage values may be nominal voltage ranges, such that the electronic system may receive AC voltage from 12 V to 28 V, or a wider range of voltage depending on the condition of the AC mains power 120 or a configuration of the step-down transformer 122. In this example, the circuit component 126 includes a coil 202 of a doorbell chime solenoid, though the described aspects may be implemented with any other type of component (e.g., active component, passive component) with an impedance that is different from an internal impedance of the bypass circuit 104. A first terminal of the coil 202 is electrically coupled to a first leg, phase, or circuit branch of the AC power provided by the AC transformer 122 and a second coil of the coil 202 is electrically coupled to the user device 118.

To enable current to bypass the coil 202, the bypass circuit 104 may be connected in parallel with the coil 202 as shown in FIG. 2. In aspects, the bypass circuit 104 includes a fuse 204 (e.g., thermal fuse, positive temperature coefficient (PTC) device) electrically coupled in series with a bypass switch 206 and/or a current-limiting resistor 208 of the bypass circuit 104. The fuse 204 may be configured to protect components of the bypass circuit 104, the user device 118, or other portions of the electrical system (not shown). Although illustrated as a single switch, the bypass switch 206 may be implemented as a combination of one or more bypass switches, configured in series, in parallel, or any combination thereof. Furthermore, the bypass switch 206 may include a relay, a solid-state relay (SSR), a mechanical switch, a magnetic switch, and so forth. The current-limiting resistor 208 can include any number, type, or configuration of resistors, which may include a single resistor, as illustrated, or two or more resistors in parallel, two or more resistors in series, or any combination thereof.

The bypass circuit 104 may also include a rectifier 210 and power and control circuitry 212 (power and control circuitry 212) for operating the bypass switch 206. In some cases, the bypass switch 206 is configured as a normally closed (N.C.) switch, such that the bypass switch normally enables AC current to flow from the AC transformer 122 to the user device 118 without passing through the coil 202 of the doorbell chime. Thus, the rectifier 210 may convert the AC power to DC power by which to operate the power and control circuitry 212 of the bypass switch 206. For example, when the bypass switch 206 is activated, or opened, the AC current may be directed through the coil 202 to allow operation of the doorbell chime. As shown in FIG. 2, when bypass switch 206 of the bypass circuit 104 is closed, the AC current (dashed lines) flows through the fuse 204, bypass switch 206, current-limiting resistor 208 to the user device 118 while bypassing the coil 202 of the doorbell chime.

In aspects, the user device 118 receives AC power from the bypass circuit 104 through a first terminal that is electrically coupled to a second terminal of the bypass circuit 104 and/or a second terminal of the coil 202. A second terminal of the user device 118 is electrically coupled to a second leg, phase, or circuit branch of the AC power provided by the AC transformer 122. The user device 118 includes a switch 214 to direct the AC current into power circuitry 128 of the user device 118 (e.g., switch 214 open) or through the coil 202 (e.g., switch 214 closed and bypass switch 206 open) to activate or operate the doorbell chime. In some cases, the switch 214 is configured as a normally open (N.O.) switch, such that the switch 214 normally enables AC current to flow from the bypass circuit 104 into the power circuitry 128 of the user device 118 without passing through the coil 202 of the doorbell chime. As shown in FIG. 2, when the switch 214 of the user device 118 is open, the AC current (dashed lines) flows into a rectifier circuit 216 and AC/DC conversion block 218 of the power circuitry 128 to provide DC power to system circuitry 130, which includes a doorbell system 220 in this example. In what may be referred to as a "normal" mode of operation, this AC current passes from the AC transformer 122 through the fuse 204, the bypass switch 206, and the current-limiting resistor 208 into the power circuitry 128 of the user device 118. Thus, the AC current flow is subject to the combined impedance of the fuse 204, the bypass switch 206, and the current-limiting resistor 208. These switch and current-limiting resistor components typically have a low impedance, such that AC power reaching the user device 118 through the bypass circuit 104 is clean or at least less polluted or with a lower level of total harmonic distortion than AC power passing through the coil 202 of the doorbell chime.

As shown in FIG. 2, a harmonic-based circuit state detector 134 may be electrically coupled to AC power terminals of the user device 118. Here, a first terminal of the harmonic-based circuit state detector 134 is coupled to the first terminal of the user device 118 and a second terminal of the harmonic-based circuit state detector 134 is coupled to the second terminal of the user device 118. In aspects, the harmonic-based circuit state detector 134 may be implemented with a sensing bridge 222, a filter 224, and a comparator 226. Although illustrated with three components or stages, a harmonic-based circuit state detector 134 may include additional components or fewer components, including additional power conditioning circuitry, additional filter stages, resistor networks for reference voltage, or the like. In aspects, some or all of the components of the harmonic-based circuit state detector 134 are implemented as analog or hardware circuits, which enables the detector to detect or determine circuit states or fault conditions without increasing a computational load on the processor 132 of the user device 118.

As described herein, the harmonic-based circuit state detector 134 can detect or determine a state of the bypass circuit 104 or the components of the bypass circuit 104, which may include the fuse 204 or bypass switch 206. In aspects, the sensing bridge 222 rectifies AC power received at the user device 118 to provide DC power and the filter 224 filters the DC power to obtain a harmonic of the received AC power. The comparator 226 then compares a voltage of the harmonic to a threshold to determine whether the bypass circuit 104 is operating normally to pass unpolluted AC power, such as when the voltage of the harmonic is below the threshold.

Alternatively, the comparator 226 may determine, in response to the voltage of the harmonic exceeding the threshold, that the bypass circuit 104 is in a fault state, thereby directing AC power through the coil 202 causing polluted AC power to reach the user device 118. In such cases, the redirection of AC current through the coil 202 may indicate that the fuse 204 is open or that the bypass switch 206 and/or the power and control circuitry 212 failed to operate properly. In this example, an output of the comparator 226 is coupled to an input of a system-on-chip 228 (SoC 228) of the user device 118 that includes the processor 132. In response to detecting fault state of the bypass circuit 104, the comparator may output a signal or logic level to the SoC 228 indicating or alerting the SoC 228 of the fault condition. Based on the indication, the SoC 228 may then alert a user of the video-recording doorbell that the bypass circuit 104 (or bypass device 106) is in a fault state and may need to be reset, repaired, or replaced to restore normal system operation.

Figure 3:
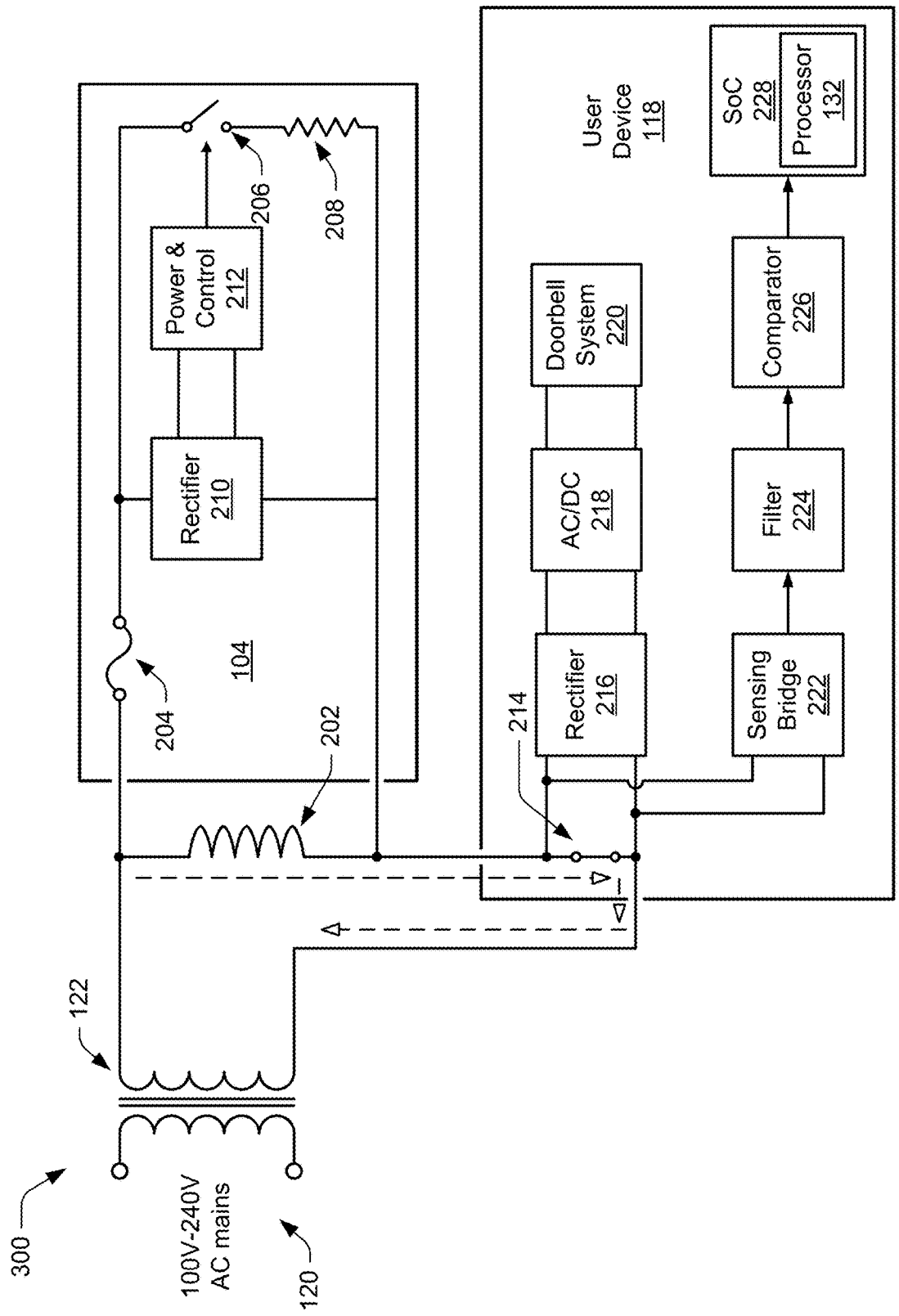
FIG. 3 illustrates the example component configuration of the electronic system of FIG. 2 with another example AC current flow for chime operation in accordance with one or more aspects.

FIG. 3 illustrates at 300 the example component configuration of the electronic system of FIG. 2 with another example of AC current flow for chime operation in accordance with one or more aspects. For visual brevity, components, circuits, or configurations described with reference to FIG. 2 may be omitted from FIGS. 3 and 4, which generally illustrate same or similar configurations of the bypass circuit 104 and user device 118. As described herein, the bypass device 106 and the user device 118 may be configured to implement a video-recording doorbell system with wireless communication capabilities. To implement some operations, the bypass circuit 104 and user device 118 may selectively direct current through the coil 202 of the solenoid of the doorbell chime assembly (not shown).

As shown in FIG. 3, the bypass circuit 104 and user device 118 may concurrently operate the bypass switch 206 and switch 214, respectively, to cause the AC current to flow through the coil 202 of the doorbell chime. For example, when the user device 118 detects operation of a doorbell switch (e.g., doorbell button, not shown) the doorbell system 220, which may be implemented by or at least partially separate from the SoC 228, closes the switch 214 to electrically couple the second terminal of the coil 202 to the AC transformer 122. The power and control circuitry 212 of the bypass circuit 104 can detect, in response to the second terminal of the coil 202 being coupled to the transformer 122, a change in input voltage that indicates activation of the doorbell chime. In response to activation of the doorbell chime, the power and control circuitry 212 opens bypass switch 206 to prevent the flow of AC current through the bypass circuit 104 and direct the AC current flow through the coil 202 of the doorbell chime as shown by the dashed lines in FIG. 3. In this state, the user device 118 may operate from local power, which may include a battery or a super capacitor, and disable the harmonic-based circuit state detector 134 while the switch 214 is closed. After the doorbell chime ringing operation is complete, the power and control circuitry 212 can close the bypass switch 206, and the doorbell system 220 can open switch 214 to return to the current flow shown in FIG. 2. The doorbell system 220 or SoC 228 may also re-enable the harmonic-based circuit state detector 134 to resume monitoring the state of the bypass circuit 104.

Figure 4:
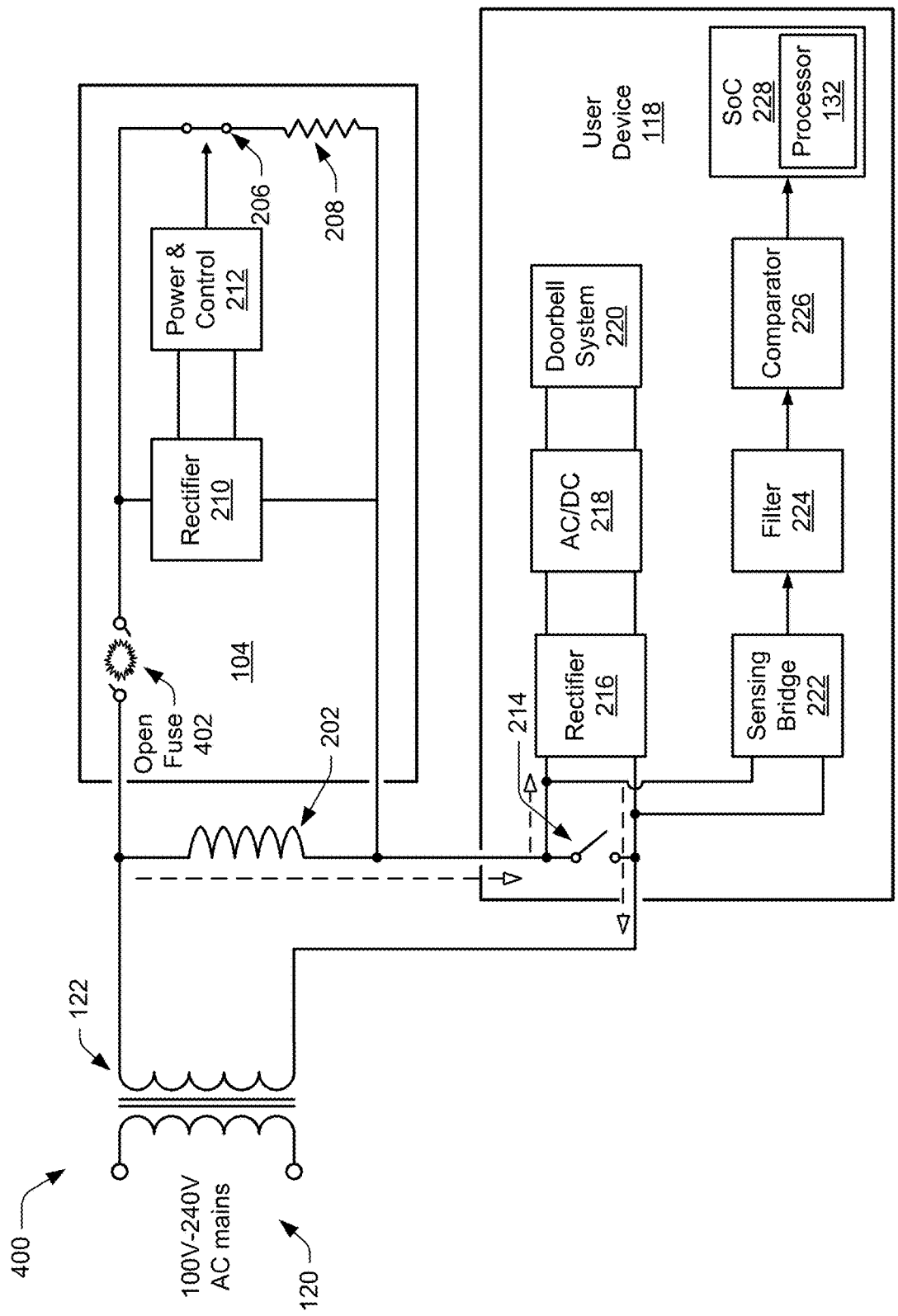
FIG. 4 illustrates the example component configuration of the electronic system of FIG. 2 with yet another example AC current flow caused by a circuit fault condition in accordance with one or more aspects.

FIG. 4 illustrates at 400 the example component configuration of the electronic system of FIG. 2 with yet another example of AC current flow caused by a circuit fault condition in accordance with one or more aspects. For visual brevity, components, circuits, or configurations described with reference to FIG. 2 may be omitted from FIGS. 3 and 4, which generally illustrate same or similar configurations of the bypass circuit 104 and user device 118. As described herein, the bypass device 106 and the user device 118 may be configured to implement a video-recording doorbell system with wireless communication capabilities. In some cases, a component of the bypass circuit 104 may fail and/or prevent AC current from flowing through the bypass circuit 104 to the user device 118. For example, as shown at 402, the fuse 204 may open resulting in an open circuit condition or fault of the bypass circuit 104. Alternatively, the switch 206 and/or power and control circuitry 212 may fail in an "open" switch condition, which would also prevent AC current from flowing through the bypass circuit 104. In such cases and as shown by the dashed lines in FIG. 4, the AC current may instead flow through the coil 202 of the doorbell chime to the AC power terminal of the user device 118. Due to increased or different impedance of the coil 202, the AC power reaching the user device 118 may be polluted or have an increased total harmonic distortion. Additionally, a constant flow of the AC current through the coil 202 may prevent or impair operation of the doorbell chime. Further, the energized coil 202 may cause the doorbell chime to ring, hum, or emit other unintended noise, resulting in user frustration or poor user experience.

In aspects, the harmonic-based circuit state detector 134 detects a circuit state or fault state of the bypass circuit 104 based on the harmonics of the AC power received by the user device 118. Here the sensing bridge 222 rectifies the polluted AC power received at the user device 118 to provide DC power and the filter 224 filters the DC power to obtain a harmonic of the received AC power. Due to the increased harmonic distortion caused by the impedance of the coil 202, one or more harmonics of the polluted AC power may have an increased voltage magnitude relative to a corresponding harmonic of clean or unpolluted AC power (e.g., AC power that passes through the bypass circuit 104). The comparator 226 then compares a voltage of the harmonic to a threshold to determine whether the bypass circuit 104 is operating normally or if the bypass circuit is in a fault state. In the context of this example, the output of the comparator 226 indicates to the SoC 228 that the bypass circuit 104 is in a fault state in response to the voltage of the harmonic exceeding the threshold configured to detect the fault state or other abnormal operation of the bypass circuit 104.

Figure 5:
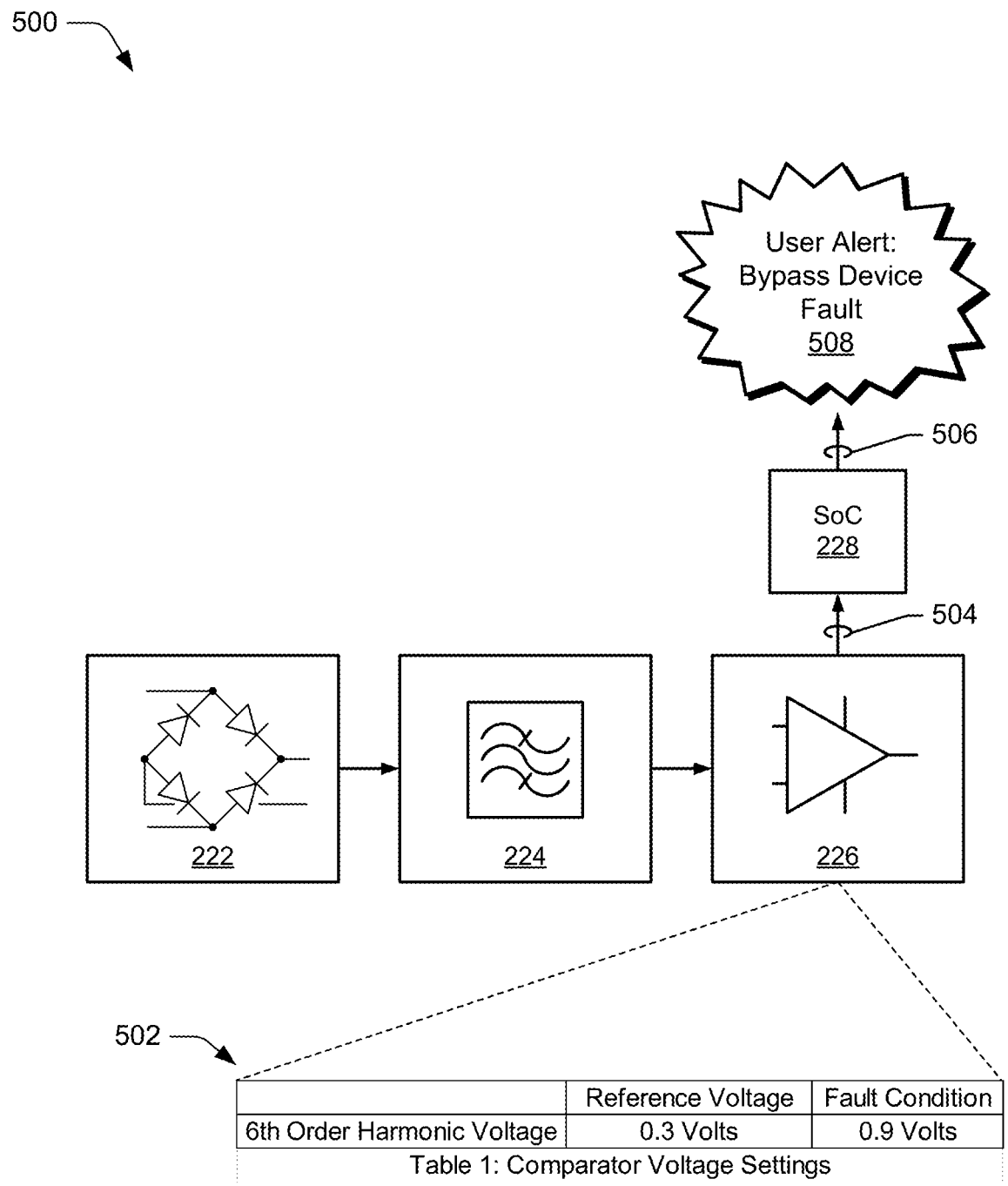
FIG. 5 illustrates an example implementation of a harmonic-based circuit state detector in accordance with one or more aspects.

FIG. 5 illustrates at 500 an example implementation of a harmonic-based circuit state detector implemented in accordance with one or more aspects. In this example, the sensing bridge 222 includes a diode rectification bridge to rectify the AC power received at the user device 118 and the filter includes a bandpass filter to filter out a residual harmonic of the AC power present in the rectified DC power. The filter 224 may be configured as any type of filter, which may include a bandpass filter to pass one or more harmonics or a high-pass filter to cut off harmonics below a particular frequency. In some cases, the filter 224 includes a bandpass filter that is configured to pass one of any harmonics between a second harmonic and a tenth harmonic of the AC power (e.g., a sixth harmonic). Alternatively or additionally, the filter 224 may be configured to pass any multiple of a fundamental frequency (e.g., 50 Hz or 60 Hz), including 100 Hz, 120 Hz, 150 Hz, 180 Hz, 200 Hz, 240 Hz, 250 Hz, 300 Hz, 350 Hz, 360 Hz, 400 Hz, 420 Hz, 480 Hz, and so forth. After filtering, the filter 224 passes one or more harmonics (e.g., residual harmonics) of the AC power to the comparator 226.

In aspects, the comparator 226 can be configured with a threshold to enable the detection of a fault in the bypass circuit 104 based on a voltage of the filtered harmonic received from the filter circuit 224. As shown in Table 1, at 502, a reference voltage level for a sixth harmonic may be approximately 0.3 V (e.g., during normal bypass operation) and a voltage level of the sixth harmonic associated with a fault condition may be approximately 0.9 V. As such, the voltage threshold level of the comparator 226 may be set from between 0.4 V to 0.8 V to enable the harmonic-based circuit state detector 134 to detect a fault of the bypass circuit 104. In some cases, the threshold level of the comparator is set using hardware, which may include a resistor, laser-trimmed resistors, a resistor network, a potentiometer, or the like. Alternatively, the SoC 228 may provide a configurable voltage threshold via an analog output, digital-to-analog (DAC) circuit, digital potentiometer, and so forth. In response to the voltage of the harmonic exceeding the threshold, an output 504 may transition to an active state to notify the SoC 228 or processor 132 of the detected fault condition. The SoC 228 may then provide an indication 506 of the fault condition, which may include a user alert 508 of the bypass device fault and/or notification to a service provider associated with the video-recording doorbell system.

Figure 6:
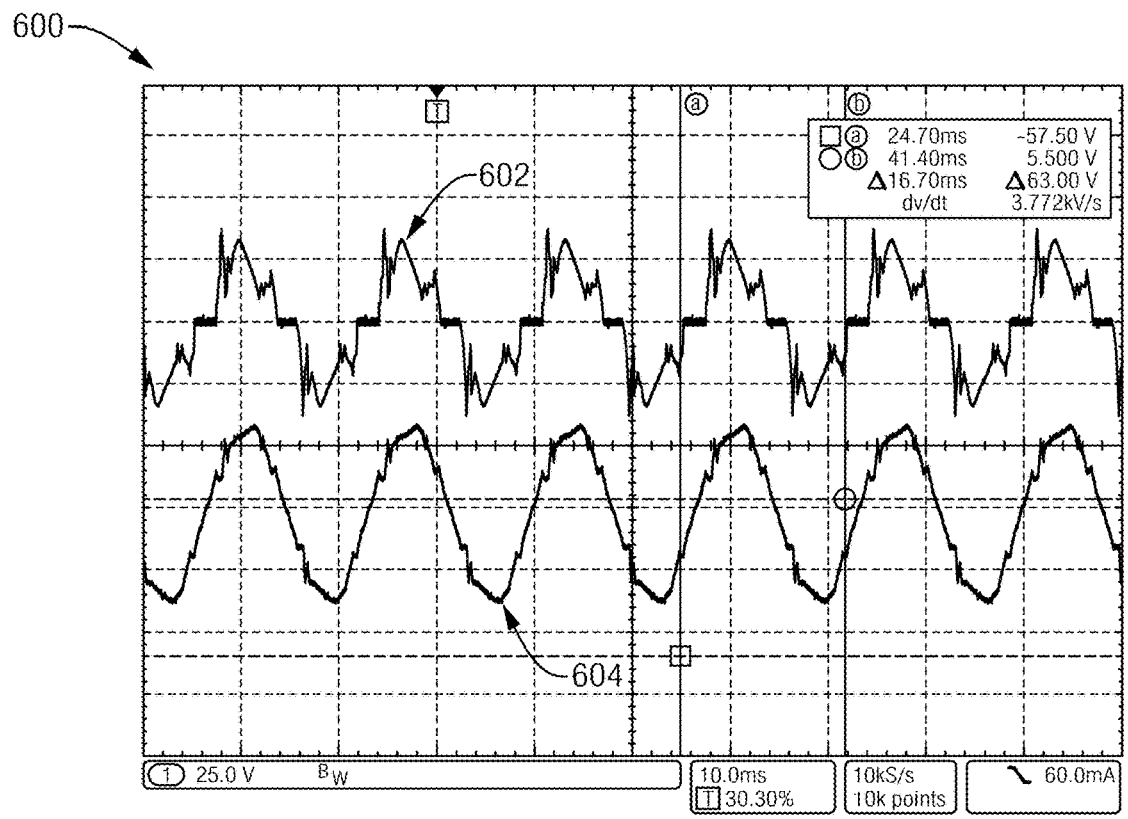
FIG. 6 depicts example plots of electrical power for a bypass device operating in a normal circuit condition and a fault circuit condition.
Figure 6:
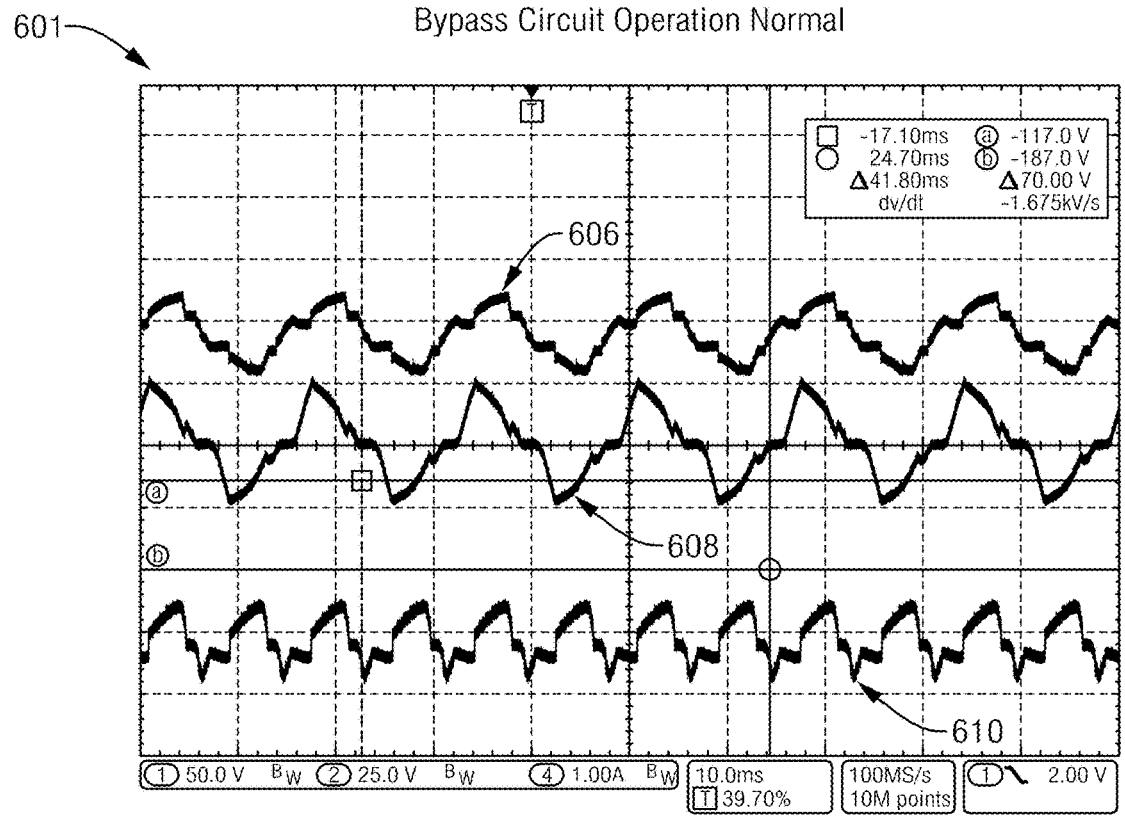

By way of example, consider FIG. 6 in which example plots of electrical power for a bypass device operating in a normal circuit condition and a fault circuit condition are depicted at 600 and 601, respectively. In plot 600, waveform 602 represents AC current at the user device 118 (e.g., doorbell device) and waveform 604 represents AC voltage at the user device 118. As shown at 600, the AC voltage waveform 604 approximates a sinusoidal waveform that correlates to AC power with a lower level of harmonic distortion. Accordingly, a higher harmonic, such as a sixth harmonic of the AC voltage waveform 604, may have a low voltage magnitude relative to a corresponding harmonic of a polluted AC power supply. In contrast with plot 600, waveforms of plot 601 represent AC voltage and AC current of AC power received through a higher impedance path, such as the doorbell chime coil or solenoid when the fuse of the bypass circuit is open. In plot 601, waveform 606 represents AC voltage at the user device 118 (e.g., doorbell device), waveform 608 represents AC current at the user device 118, and waveform 610 represents an output of the sensing bridge 222 of the harmonic-based circuit state detector 134. Note that the AC voltage waveform 606 and the waveform 610 of the rectified output of the sensing bridge 222 do not approximate a smooth sinusoidal wave due to harmonic distortion caused by the AC current flowing through the coil of the doorbell chime. Thus, a voltage magnitude of the sixth harmonic of the AC voltage 606 will exceed the voltage threshold of the comparator 226 and the harmonic-based circuit state detector 134 will detect that the bypass circuit 104 is in a fault condition or inoperable state.

Example Methods

Example methods 700 and 800 are described with reference to FIG. 7 and FIG. 8, respectively, in accordance with one or more aspects of AC power harmonic-based circuit state detection. Generally, the methods 700 and 800 illustrate sets of operations (or acts) that may be performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to the environment 100 of FIG. 1, apparatuses, devices, systems, or configurations of FIG. 2 through FIG. 6, systems of FIG. 9, and/or entities detailed in FIG. 1 or other figures, reference to which is made for example only. The techniques and systems described in this disclosure are not limited to an embodiment or performance by one entity or multiple entities operating on one device or those described with reference to the figures.

Figure 7:
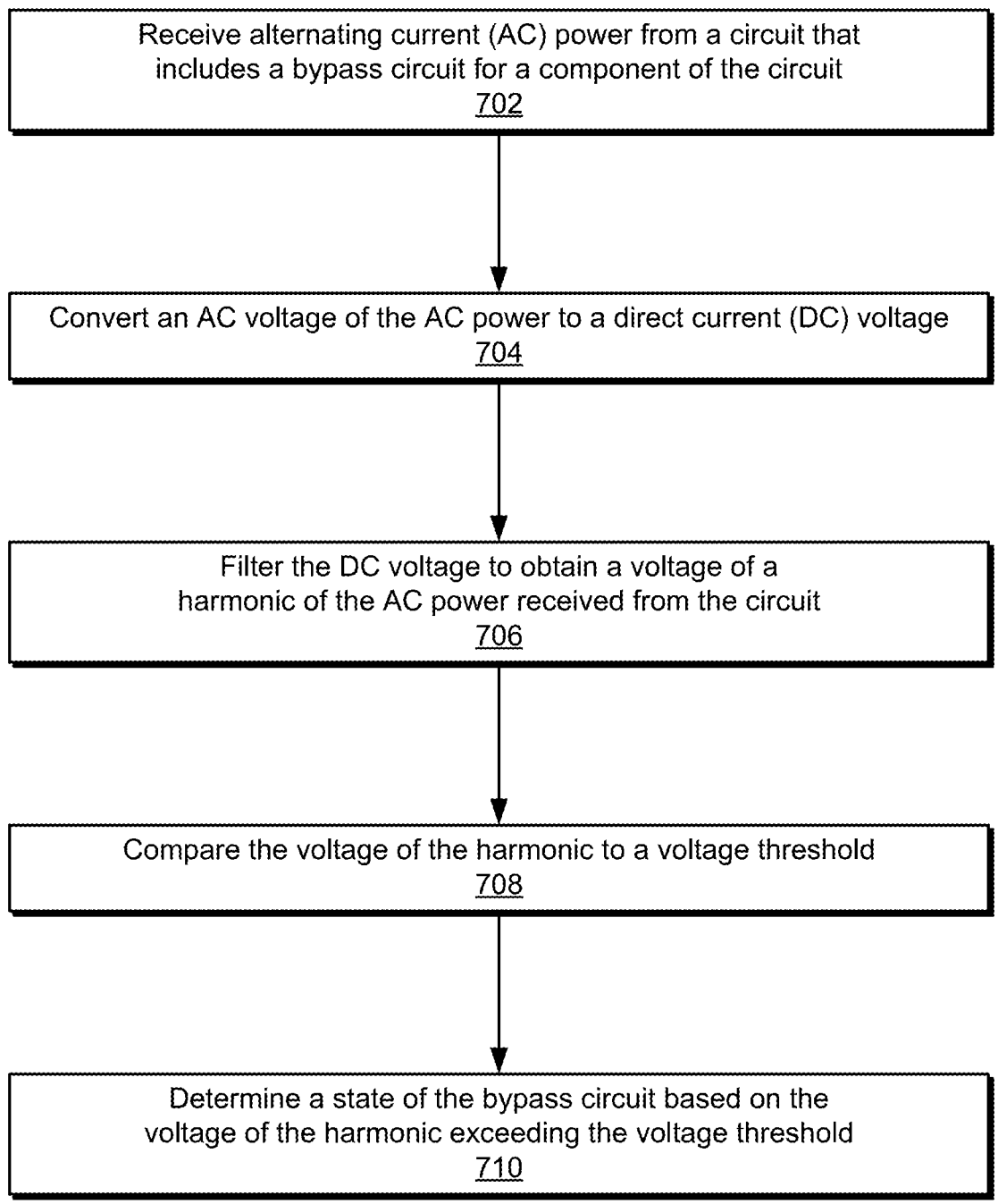
FIG. 7 illustrates an example method for AC power harmonic-based circuit state detection in accordance with one or more aspects.

FIG. 7 illustrates an example method 700 for implementing AC power harmonic-based circuit state detection in accordance with one or more aspects, including operations performed by a harmonic-based circuit state detector (e.g., the harmonic-based circuit state detector 134 of FIG. 1). In some aspects, operations of the method 700 may be implemented by a controller of a video-recording doorbell system to monitor a state of a bypass circuit and/or notify a user of possible fault conditions of the system.

At 702, a controller of a system receives AC power from a circuit that includes a bypass circuit for a component of the circuit. For example, a video doorbell receives AC power from a step-down transformer through a circuit that includes a bypass puck for a doorbell chime assembly. Thus, the video doorbell receives one leg of the AC power through the bypass puck that is operably coupled to the doorbell chime assembly.

At 704, a harmonic-based circuit state detector associated with the controller converts an AC voltage of the AC power to a DC voltage or a rectified voltage. In some cases, a hardware-based harmonic-based circuit state detector is electrically coupled to AC power terminals or AC power circuitry of the controller. The harmonic-based circuit state detector may include a diode bridge rectification circuit to convert the AC power to the DC power. In aspects, the DC power includes residual harmonics of the AC power received by the controller from the AC power circuit.

At 706, the harmonic-based circuit state detector filters the DC voltage to obtain a voltage magnitude of a harmonic of the AC power received from the circuit. The harmonic-based circuit state detector may implement a bandpass filter or a high-pass filter to obtain the voltage magnitude of the harmonic. The harmonic for which the voltage is obtained may be any suitable harmonic, including a fourth harmonic, a fifth harmonic, a sixth harmonic, a seventh harmonic, and so forth. The harmonic-based circuit state detector may implement a hardware-based filter (e.g., analog circuitry) or digital filter (e.g., of an SoC) to filter the harmonic from the DC voltage. Alternatively or additionally, the harmonic-based circuit state detector filters the DC voltage to obtain multiple harmonics or an indication of THD present in the AC power.

At 708, the harmonic-based circuit state detector compares the voltage magnitude of the harmonic to a voltage threshold. The voltage threshold may be configured to detect a circuit state or fault condition of the bypass circuit of the system. For example, a particular circuit state or a fault condition may divert current through the component instead of the bypass circuit resulting in distortion of the AC power that reaches the controller of the system. To do so, the harmonic-based circuit state detector may include a hardware-based comparator or a digital logic comparator (e.g., in digital logic of an SoC). Alternatively or additionally, the harmonic-based circuit state detector filters compares voltage magnitude of multiple harmonics or a voltage magnitude of THD present in the AC power to a threshold.

At 710, the harmonic-based circuit state detector determines a state of the bypass circuit based on the voltage of the harmonic exceeding the voltage threshold. The harmonic-based circuit state detector may determine that the bypass circuit is in a fault state in response to the voltage of the harmonic exceeding the voltage threshold. For example, a fuse or bypass switch of the bypass circuit may be open, preventing current flow through the bypass circuit and causing the current received at the controller to pass through a high impedance path, which in turn results in the harmonic distortion of the AC power.

Figure 8:
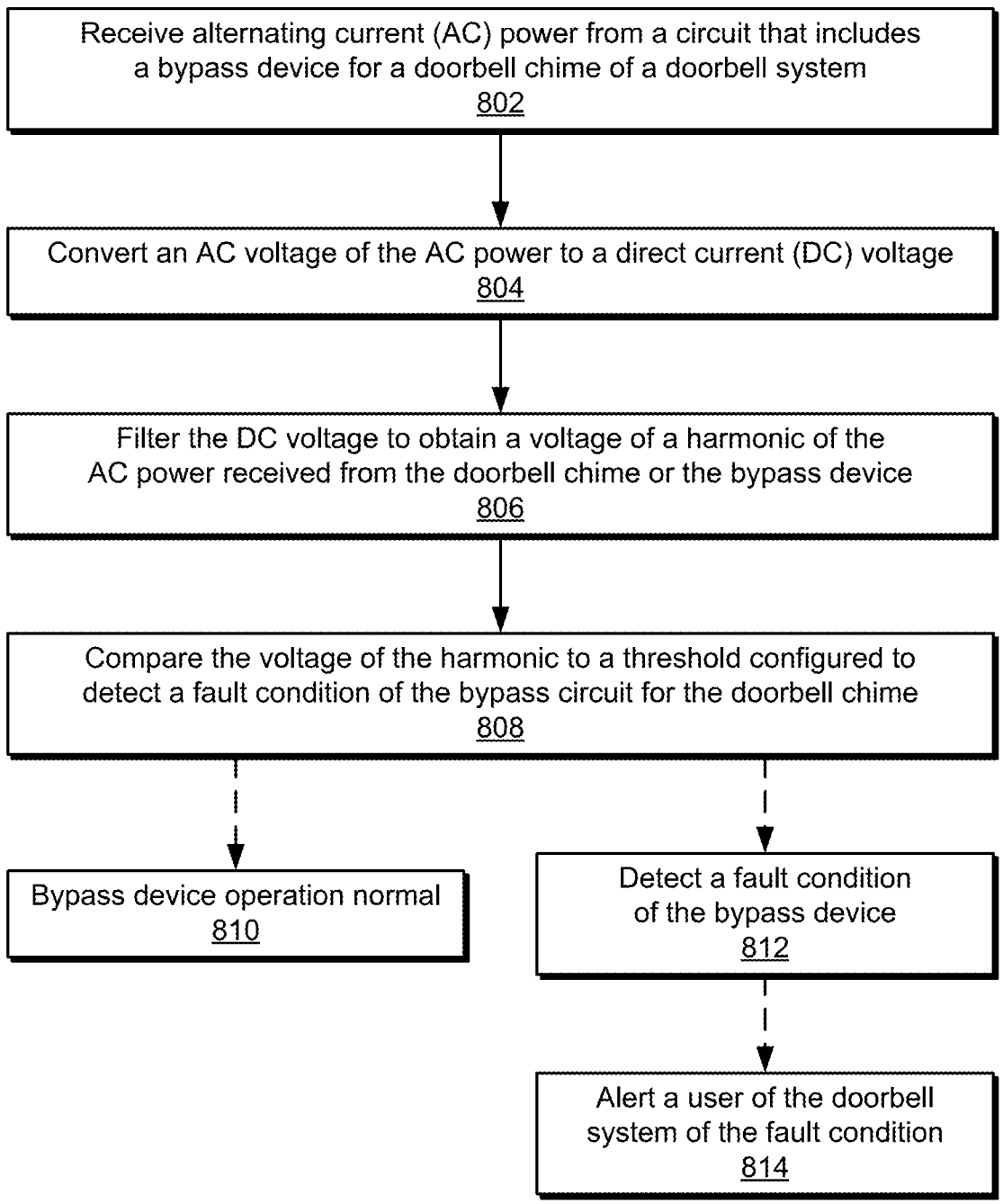
FIG. 8 illustrates an example method for detecting a state of a bypass device of a doorbell chime.

FIG. 8 illustrates an example method 800 for detecting a state of a bypass device of a doorbell chime in accordance with one or more aspects, including operations performed by a harmonic-based circuit state detector (e.g., the harmonic-based circuit state detector 134 of FIG. 1). In some aspects, operations of the method 800 may be implemented by a controller of a video-recording doorbell system detect a fault condition of the doorbell chime bypass device and/or notify a user of possible fault conditions of the system.

At 802, a controller receives AC power from a circuit that includes a bypass device for a doorbell chime of a doorbell system. For example, the controller may be a video doorbell that receives one leg of the AC power through the bypass device, which is electrically coupled in parallel with the coil of the doorbell chime.

At 804, a harmonic-based circuit state detector associated with the controller converts AC voltage of the AC power to a DC voltage or rectified voltage. In the context of the present example, the video doorbell may include a diode rectification bridge that is coupled between AC terminal or AC power circuitry of the video doorbell.

At 806, the harmonic-based circuit state detector filters the DC voltage or rectified voltage to obtain a voltage of a harmonic of the AC power received from the doorbell chime or the bypass device. Continuing the present example, a harmonic-based circuit state detector of the video doorbell includes a resistor-inductor-capacitor (RLC) bandpass filter configured to extract a sixth harmonic of the AC power received at the video doorbell.

At 808, the harmonic-based circuit state detector compares the voltage of the harmonic to a threshold configured to detect a fault condition of the bypass circuit of the doorbell chime. In the context of the present example, an SoC of the video doorbell implements a digital comparator to compare the voltage magnitude of the harmonic provided by the hardware filter circuit to a threshold configured to determine if the bypass device of the doorbell system is in a fault state (e.g., blown fuse or N.C. stuck open).

Optionally at 810, the harmonic-based circuit state detector determines that operation of the bypass device for the doorbell chime is normal. In response to the voltage magnitude of the harmonic not exceeding the threshold, the harmonic-based circuit state detector or SoC may determine that the bypass device of the system is operating normally.

Optionally at 812, the harmonic-based circuit state detector detects a fault condition in the operation of the bypass device for the doorbell chime. In response to the voltage magnitude of the harmonic exceeding the threshold, the harmonic-based circuit state detector or SoC may determine that the bypass device of the system is in a fault state. For example, a fuse or switch in the bypass current path may be open, causing the AC current to divert through the coil of the doorbell chime.

Optionally at 814, the controller provides an alert to a user of the doorbell system that the bypass device is in a fault condition. To alert the user, the SoC or video doorbell may cause an application associated with the video doorbell to warn the user that the bypass device (e.g., door chime puck) is not functioning correctly, and needs to be reset, repaired, or replaced to resume normal operation of the doorbell system.

Example System-on-Chip

Figure 9:
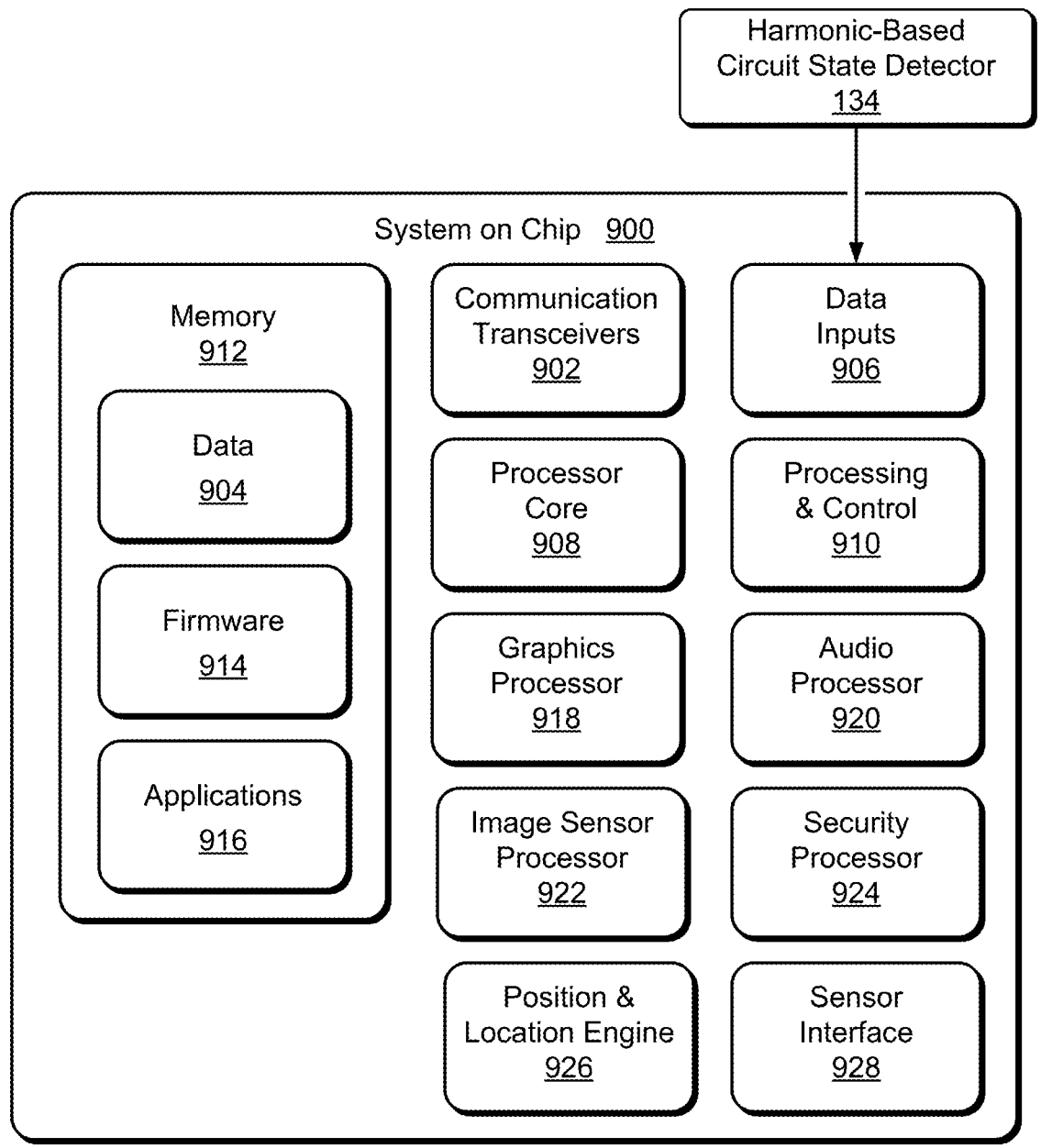
FIG. 9 illustrates an example component configuration of a system-on-chip that may be configured to implement aspects of AC power harmonic-based circuit state detection.

FIG. 9 illustrates an example system-on-chip 900 (SoC 900) that can implement various aspects of alternating-current (AC) power harmonic-based circuit state detection. The entities or components of the SoC 900, either alone or in combination, may implement one or more aspects of alternating-current (AC) power harmonic-based circuit state detection described with reference to the preceding FIGS. 1-8. For example, the SoC 900 may implement a digital filter and/or comparator to filter and compare a rectified waveform received from a sensing bridge. The SoC 900 may be implemented with any suitable combination of components or elements and may include other components shown or described with reference to any of the other FIGS. 1-8.

FIG. 9 illustrates an example system-on-chip (SoC) that may implement aspects of alternating-current (AC) power harmonic-based circuit state detection to determine that a component or circuit of a system is in a fault state. The SoC 900 may be embodied as or within any type of user device (e.g., user device 118), video-recording doorbell system, thermostat, smart electric panel, apparatus, another device, or system as described with reference to FIGS. 1-8 to implement alternating-current (AC) power harmonic-based circuit state detection in accordance with one or more aspects. Although described with reference to chip-based packaging, the components shown in FIG. 9 may also be embodied as other systems or component configurations, such as, and without limitation, a Field-Programmable Gate Arrays (FPGA), an Application-Specific Integrated Circuits (ASIC), an Application-Specific Standard Products (ASSP), a digital signal processor (DSP), Complex Programmable Logic Devices (CPLD), a system in package (SiP), package on package (POP), processing and communication chipset, communication co-processor, sensor co-processor, or the like. In the context of FIG. 9, the SoC 900 may be coupled with an instance of a harmonic-based circuit state detector 134 as described with reference to FIGS. 1-8. For example, the harmonic-based circuit state detector 134 can be implemented as analog or discrete circuitry operably coupled to an input of the SoC 900.

In this example, the SoC 900 includes communication transceivers 902 that enable wired or wireless communication of system data 904 (e.g., video data, audio data, data scheduled for transmission, packetized, or the like). In some aspects, the communication transceivers 902 includes a modem or baseband processor that is configurable to communicate in accordance with various communication protocols and/or in different frequency bands, such as those protocols or frequency bands described throughout this disclosure. The communication transceivers 902 may include a transceiver interface (not shown) for communicating encoded or modulated signals with transceiver circuitry, including transmitter chain and receiver chain circuitry, operably coupled with respective antennas.

The system data 904 or other system content can include configuration settings of the system or various components, media content stored by the system, and/or information associated with a user of the system. Media content stored on the SoC 900 may include any type of recorded audio, video, and/or image data. The SoC 900 also includes one or more data inputs 906 via which any type of data, media content, signals, and/or inputs can be received, such as circuit state indications, user input, user-selectable inputs (explicit or implicit), or any other type of audio, video, and/or image data received from a content and/or data source. Alternatively or additionally, the data inputs 906 may include various data interfaces, which can be implemented as any one or more of a serial and/or parallel interface, a wireless interface, a network interface, and as any other type of communication interface enabling communication with other devices or systems.

The SoC 900 includes one or more processor cores 908 (e.g., processor 132), which process various computerexecutable instructions to control the operation of the SoC 900 and to enable techniques for AC power harmonic-based circuit state detection. Alternatively or additionally, the SoC 900 can be implemented with any one or a combination of hardware, firmware, or fixed logic circuitry that is implemented in connection with processing and control circuits, which are generally shown at 910. Although not shown, the SoC 900 may also include a bus, interconnect, crossbar, or fabric that couples the various components within the system.

The SoC 900 also includes a memory 912 (e.g., computer-readable media), such as one or more memory circuits that enable persistent and/or non-transitory data storage, and thus do not include transitory signals or carrier waves. Examples of the memory 912 include RAM, SRAM, DRAM, NVRAM, ROM, EPROM, EEPROM, or flash memory. The memory 912 provides data storage for the system data 904, as well as for firmware 914, applications 916, and any other types of information and/or data related to operational aspects of the SoC 900. For example, the firmware 914 can be maintained as processor-executable instructions of an operating system (e.g., real-time OS) within the memory 912 and executed on one or more of the processor cores 908.

The applications 916 may include a system manager, such as any form of a control application, software application, signal processing and control module, code that is native to a particular system, an abstraction module or gesture module and so on. The memory 912 may also store system components or utilities for implementing aspects of AC power harmonic-based circuit state detection, such as a user alert system and a lookup table of voltage thresholds useful for circuit state determination. These entities may be embodied as combined or separate components, examples of which are described with reference to corresponding entities or functionality as illustrated in FIGS. 1-8. In some aspects, the harmonic-based circuit state detector 134 interacts with the SoC 900 to implement aspects of AC power harmonic-based circuit state detection. Although shown as separate from the SoC 900, one or more elements of the harmonic-based circuit state detector may be implemented, in whole or in part, through hardware or firmware of the SoC 900.

In some aspects, the SoC 900 also includes additional processors or co-processors to enable other functionalities, such as a graphics processor 918, audio processor 920, and image sensor processor 922. The graphics processor 918 may capture and/or render graphical content associated with a user interface, operating system, or applications of the system-on-chip 900. In some cases, the audio processor 920 encodes or decodes audio data and signals, such as audio signals and information associated with audio recorded along with a video by a video-recording doorbell system for playback, upload, or streaming. The image sensor processor 922 may be coupled to an image sensor and provide image data processing, video capture, and other visual media conditioning and processing functions.

The SoC 900 may also include a security processor 924 to support various security, encryption, and cryptographic operations, such as providing secure communication protocols and encrypted data storage. Although not shown, the security processor 924 may include one or more cryptographic engines, cipher libraries, hashing modules, or random number generators to support encryption and cryptographic processing of information or communications of the system-on-chip 900. Alternatively or additionally, the system-on-chip 900 can include a position and location engine 926 and a sensor interface 928. Generally, the position and location engine 926 may provide positioning or location data by processing signals of a Global Navigation Satellite System (GNSS) and/or other motion or inertia sensor data (e.g., dead-reckoning navigation). The sensor interface 928 enables the system-on-chip 900 to receive data from various sensors, such as capacitance and motion sensors. In some aspects, the harmonic-based circuit state detector 134 may interact with any of the processor or co-processor of the system-on-chip 900 to aspects (e.g., system and/or user alerts) of AC power harmonic-based circuit state detection.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

ADDITIONAL EXAMPLES

In the following section, additional examples are provided.

Example 1

A system comprising: a first current input/output (I/O) node configured to receive alternating current (AC) power; a second current I/O node configured to receive the AC power; a passive component comprising a first terminal coupled to the first current I/O node; a bypass circuit comprising a first terminal coupled to the first terminal of the passive component, a second terminal coupled to a second terminal of the passive component, and a switch coupled between the first terminal and second terminal of the bypass circuit; and a controller comprising a first terminal coupled to the second terminal of the passive component and the second terminal of the bypass circuit, a second terminal coupled to the second current I/O node, and an AC power harmonic-based circuit state detector configured to: convert an AC voltage of the AC power received at the first terminal and second terminal of the controller to a direct current (DC) voltage; filter the DC voltage to obtain a voltage of a harmonic of the AC power received at the first terminal and the second terminal of the controller; compare the voltage of the harmonic of the AC power to a voltage threshold; and determine a state of the bypass circuit based on the comparison of the voltage of the harmonic of the AC power to the voltage threshold.

Example 2

The system of example 1 or any other example, wherein the AC power harmonic-based circuit state detector comprises: a diode-based rectifier configured to convert the AC voltage of the AC power received at the first terminal and second terminal of the controller to the DC voltage; an analog filter circuit configured to filter the DC voltage to obtain the voltage of the harmonic of the AC power received at the first terminal and the second terminal of the controller; or an analog comparator configured to compare the voltage of the harmonic of the AC power to the voltage threshold to provide an output indicative of the state of the bypass circuit.

Example 3

The system of example 1 or any other example, wherein: the controller further comprises a processor with an input; and the AC power harmonic-based circuit state detector is further configured to provide an indication of the state of the bypass circuit to the input of the processor of the controller.

Example 4

The system of example 3 or any other example, wherein the processor of the controller is further configured to generate a user alert in response to the indication of the stage of the bypass circuit.

Example 5

The system of any one of examples 1 to 4 or any other example, wherein: the bypass circuit comprises a fuse coupled between the switch and one of the first terminal of the bypass circuit or the second terminal of the bypass circuit; and the state of the bypass circuit comprises one of a first state in which the fuse of the bypass circuit is function or a second state in which the fuse of the bypass circuit is not functional.

Example 6

The system of example 1 or any other example, wherein the bypass circuit further comprises: a rectifier to convert AC power received at the first terminal and the second terminal of the bypass circuit to DC power; switch control logic coupled to the rectifier of the bypass circuit and the switch of the bypass circuit; and a resistor configured to limit an amount of AC power current that flows between the first terminal and the second terminal of the bypass circuit.

Example 7

The system of any one of examples 1 to 6 or any other example, wherein the AC power harmonic-based circuit state detector comprises an analog filter circuit that is configured as a bandpass filter.

Example 8

The system of example 7 or any other example, wherein the bandpass filter is configured to pass one or more harmonics of the AC power received at the first terminal and the second terminal of the controller.

Example 9

The system of example 8 or any other example, wherein the bandpass filter is configured to pass one of a fifth harmonic of the AC power, a sixth harmonic of the AC power, or a seventh harmonic of the AC power.

Example 10

The system of any one of examples 1 to 9 or any other example, wherein the passive component comprises an inductor, a coil, or a solenoid.

Example 11

The system of example 10 or any other example, wherein the passive component is implemented as part of a doorbell chime.

Example 12

The system of any one of examples 1 to 11 or any other example, wherein the controller is configured as a video-recording doorbell device that is coupled to the passive component and bypass circuit of the system.

Example 13

The system of any one of examples 1 to 12 or any other example, wherein a range of the voltage of the AC power received at the first terminal of the passive component and the second terminal of the controller comprises 12 Volts to 28 Volts.

Example 14

The system of any one of the examples 1 to 13 or any other example, wherein the AC power harmonic-based circuit state detector is further configured to: filter the DC voltage to obtain respective voltages of multiple harmonics of the AC power or a level of total harmonic distortion (THD) of the AC power, the THD including at least the harmonic; compare the respective voltages of the multiple harmonics of the AC power or the level of THD of the AC power to a the voltage threshold; and determine the state of the bypass circuit based on the comparison of the respective voltages of the multiple harmonics of the AC power or the THD of the AC power to the voltage threshold.

Example 15

The system of any one of examples 1 to 14 or any other example, wherein: the first terminal of the passive component is coupled to a first leg of a step-down transformer; and the second terminal of the controller is coupled to a second leg of the step-down transformer.

Example 16

A system comprising: a doorbell chime comprising a first terminal coupled to a first terminal of transformer configured to provide alternating current (AC) power; a bypass device comprising a first terminal coupled to the first terminal of the transformer; a video-recording doorbell comprising a first terminal coupled to a second terminal of the doorbell chime or a second terminal of the bypass device; a second terminal coupled to a second terminal of the transformer, and an AC power harmonic-based circuit state detector configured to: convert an AC voltage of the AC power to a direct current DC voltage; filter the DC voltage to obtain a voltage of a harmonic of the AC power received through the doorbell chime or bypass device; compare the voltage of the harmonic of the AC power to a voltage threshold; and detect a fault condition of the bypass device in response to the voltage of the harmonic of the AC power exceeding the voltage threshold.

Example 17

A method comprising: receiving AC power from a circuit that includes a bypass circuit for a component of the circuit; converting an AC voltage of the AC power to a DC voltage; filtering the DC voltage to obtain a voltage of a harmonic of the AC power received from the circuit; comparing the voltage of the harmonic to a voltage threshold; and determining a state of the bypass circuit based on the voltage of the harmonic exceeding the voltage threshold.

Example 18

The method of example 17 or any other example, further comprising alerting a service provider or user of a system that includes the circuit to a fault condition of the bypass circuit when detected as the state of the bypass circuit.

Example 19

A system comprising: a first current input/output (I/O) node configured to receive alternating current (AC) power; a second current I/O node configured to receive the AC power; and a controller comprising a first terminal coupled to the first current I/O node, a second terminal coupled to the second current I/O node, and an AC power harmonic-based circuit state detector configured to: convert an AC voltage of the AC power received at the first terminal and second terminal of the controller to a direct current (DC) voltage; filter the DC voltage to obtain a voltage of a harmonic of the AC power received at the first terminal and the second terminal of the controller; compare the voltage of the harmonic of the AC power to a voltage threshold; and determine a state of the bypass circuit based on the comparison of the voltage of the harmonic of the AC power to the voltage threshold.

Example 20

The system of example 19, wherein the system comprises one of a video-doorbell, a thermostat, a garage door opener, an intercom system, a lighting controller, a smart home automation system, a smart electric panel, a smoke detector, an Internet-of-Things (IoT) device, a smart appliance, a power grid-monitoring device, a solar inverter, a home battery storage system, a gasoline generator, a diesel generator, a natural gas generator, or a regenerative AC power source.

Example 21

The system of example 19, wherein the system comprises the smart electric panel and the smart electric panel comprises: one or more electronically controllable breakers; or an electronically controllable main disconnect switch; and a panel controller configured to notify a user of a state of the smart electric panel or alter a connection state of at least one of the electronically controllable breakers or electronically controllable main disconnect switch based on a state of AC power, the state of the smart electric panel (e.g., undervoltage or overvoltage lockout), or user input (e.g., to reset the smart electric panel, one of the breakers, or the main disconnect).

Example 22

The example of any one of examples 19 to 21 or any other example; wherein the AC power harmonic-based circuit state detector is further configured to: obtain, from the DC voltage, respective voltages of multiple harmonics of the AC power or a level of total harmonic distortion (THD) of the AC power, the THD including at least the harmonic; compare the respective voltages of the multiple harmonics of the AC power or the level of THD of the AC power to a the voltage threshold; and determine the state of the bypass circuit based on the comparison of the respective voltages of the multiple harmonics of the AC power or the THD of the AC power to the voltage threshold

CONCLUSION

Although aspects of AC power harmonic-based circuit state detection have been described in language specific to features and/or methods, the subject of the appended claims is not necessarily limited to the specific features, components, or methods described. Rather, the specific features, components, and methods are disclosed as example implementations of the techniques for AC power harmonic-based circuit state detection, and other equivalent features and methods are intended to be within the scope of the appended claims. Further, various aspects are described, and it is to be appreciated that each described aspect can be implemented independently or in connection with one or more other described aspects.

What is claimed is:

1. A system comprising:
a first current input/output (I/O) node configured to receive alternating current (AC) power;
a second current I/O node configured to receive the AC power;
a passive component comprising a first terminal coupled to the first current I/O node;
a bypass circuit comprising a first terminal coupled to the first terminal of the passive component, a second terminal coupled to a second terminal of the passive component, and a switch coupled between the first terminal and second terminal of the bypass circuit; and
a controller comprising a first terminal coupled to the second terminal of the passive component and the second terminal of the bypass circuit, a second terminal coupled to the second current I/O node, and an AC power harmonic-based circuit state detector configured to:
convert an AC voltage of the AC power received at the first terminal and second terminal of the controller to a direct current (DC) voltage;
filter the DC voltage to obtain a voltage of a harmonic of the AC power received at the first terminal and the second terminal of the controller;
compare the voltage of the harmonic of the AC power to a voltage threshold; and
determine a state of the bypass circuit based on the comparison of the voltage of the harmonic of the AC power to the voltage threshold.
2. The system of claim 1, wherein the AC power harmonic-based circuit state detector comprises:
a diode-based rectifier configured to convert the AC voltage of the AC power received at the first terminal and second terminal of the controller to the DC voltage;

an analog filter circuit configured to filter the DC voltage to obtain the voltage of the harmonic of the AC power received at the first terminal and the second terminal of the controller; or an analog comparator configured to compare the voltage of the harmonic of the AC power to the voltage threshold to provide an output indicative of the state of the bypass circuit.

3. The system of claim 1, wherein:
the controller further comprises a processor with an input; and
the AC power harmonic-based circuit state detector is further configured to provide an indication of the state of the bypass circuit to the input of the processor of the controller.

4. The system of claim 3, wherein the processor of the controller is further configured to generate a user alert in response to the indication of the state of the bypass circuit.

5. The system of claim 1, wherein:
the bypass circuit comprises a fuse coupled between the switch and one of the first terminal of the bypass circuit or the second terminal of the bypass circuit; and
the state of the bypass circuit comprises one of a first state in which the fuse of the bypass circuit is functional or a second state in which the fuse of the bypass circuit is not functional.

6. The system of claim 1, wherein the bypass circuit further comprises:
a rectifier to convert AC power received at the first terminal and the second terminal of the bypass circuit to DC power;
switch control logic coupled to the rectifier of the bypass circuit and the switch of the bypass circuit; and
a resistor configured to limit an amount of AC power current that flows between the first terminal and the second terminal of the bypass circuit.

7. The system of claim 1, wherein the AC power harmonic-based circuit state detector comprises an analog filter circuit that is configured as a bandpass filter.

8. The system of claim 7, wherein the bandpass filter is configured to pass one or more harmonics of the AC power received at the first terminal and the second terminal of the controller.

9. The system of claim 8, wherein the bandpass filter is configured to pass one of a fifth harmonic of the AC power, a sixth harmonic of the AC power, or a seventh harmonic of the AC power.

10. The system of claim 1, wherein the passive component comprises an inductor, a coil, or a solenoid.

11. The system of claim 10, wherein the passive component is implemented as part of a doorbell chime.

12. The system of claim 1, wherein the controller is configured as a video-recording doorbell device that is coupled to the passive component and bypass circuit of the system.

13. The system of claim 1, wherein a range of the voltage of the AC power received at the first terminal of the passive component and the second terminal of the controller comprises 12 Volts to 28 Volts.

14. The system of claim 1, wherein the AC power harmonic-based circuit state detector is further configured to:
filter the DC voltage to obtain respective voltages of multiple harmonics of the AC power or a level of total harmonic distortion (THD) of the AC power, the THD including at least the harmonic;

compare the respective voltages of the multiple harmonics of the AC power or the level of THD of the AC power to the voltage threshold; and
determine the state of the bypass circuit based on the comparison of the respective voltages of the multiple harmonics of the AC power or the THD of the AC power to the voltage threshold.

15. A video-doorbell system comprising:
a doorbell chime comprising a first terminal coupled to a first terminal of a transformer configured to provide alternating current (AC) power;
a bypass device comprising a first terminal coupled to the first terminal of the transformer; and
a video-recording doorbell comprising a first terminal coupled to a second terminal of the doorbell chime or a second terminal of the bypass device; a second terminal coupled to a second terminal of the transformer, and an AC power harmonic-based circuit state detector configured to:
convert an AC voltage of the AC power to a direct current (DC) voltage;
filter the DC voltage to obtain a voltage of a harmonic of the AC power received through the doorbell chime or bypass device;
compare the voltage of the harmonic of the AC power to a voltage threshold; and
detect a fault condition of the bypass device in response to the voltage of the harmonic of the AC power exceeding the voltage threshold.

16. The video-doorbell system of claim 15, wherein the AC power harmonic-based circuit state detector comprises:
a diode-based rectifier configured to convert the AC voltage of the AC power received at the first terminal and second terminal of the video-recording doorbell to the DC voltage;
an analog filter circuit configured to filter the DC voltage to obtain the voltage of the harmonic of the AC power received at the first terminal and the second terminal of the video-recording doorbell; or
an analog comparator configured to compare the voltage of the harmonic of the AC power to the voltage threshold to provide an output indicative of the state of the bypass device.

17. The video-doorbell system of claim 15, wherein:
video-recording doorbell further comprises an input; and
the AC power harmonic-based circuit state detector is further configured to provide an indication of the state of the bypass device to the input of the video-recording doorbell.

18. The video-doorbell system of claim 17, wherein the video-recording doorbell is further configured to generate a user alert in response to the indication of the state of the bypass device.

19. The video-doorbell system of claim 15, wherein:
the bypass device comprises a switch coupled between the first terminal of the bypass device and the second terminal of the bypass device;
a fuse coupled between the switch and one of the first terminal of the bypass device or the second terminal of the bypass device; and
the state of the bypass device comprises one of a first state in which the fuse of the bypass device is functional or a second state in which the fuse of the bypass device is not functional.

20. The video-doorbell system of claim 15, wherein the bypass device further comprises:
- a rectifier to convert AC power received at the first terminal and the second terminal of the bypass circuit to DC power;
- switch control logic coupled to the rectifier of the bypass circuit and the switch of the bypass circuit; and
- a resistor configured to limit an amount of AC power current that flows between the first terminal and the second terminal of the bypass device.

* * * * *